United States Patent
Jiang et al.

(10) Patent No.: US 11,893,257 B2
(45) Date of Patent: Feb. 6, 2024

(54) MULTIPART UPLOADING TO OBJECT-BASED STORAGE

(71) Applicant: International Business Machines Corporation, Armonk, NY (US)

(72) Inventors: Peng Hui Jiang, Beijing (CN); FengLi Wang, Beijing (CN); Qi Feng Huo, Beijing (CN); Jun Su, Beijing (CN); Hong Qing Zhou, Shanghai (CN); Yan Lin Ren, Shanghai (CN); Li Zhang, Beijing (CN); Ling Ling Sh Hu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 17/840,762

(22) Filed: Jun. 15, 2022

(65) Prior Publication Data
US 2023/0409224 A1 Dec. 21, 2023

(51) Int. Cl.
*G06F 3/06* (2006.01)

(52) U.S. Cl.
CPC .......... *G06F 3/0646* (2013.01); *G06F 3/0604* (2013.01); *G06F 3/064* (2013.01); *G06F 3/0673* (2013.01)

(58) Field of Classification Search
CPC ..... G06F 16/221; G06F 16/2379; G06F 16/27
See application file for complete search history.

(56) References Cited

U.S. PATENT DOCUMENTS

| | | | |
|---|---|---|---|
| 7,082,446 B1* | 7/2006 | Bottomley | G06F 16/273 707/648 |
| 9,374,395 B2 | 6/2016 | Barton | |
| 9,507,812 B2 | 11/2016 | Bestler | |
| 9,710,535 B2 | 7/2017 | Aizman | |
| 2018/0276267 A1 | 9/2018 | Bestler | |
| 2020/0356474 A1 | 11/2020 | Doddameti | |
| 2021/0182246 A1 | 6/2021 | Foque | |

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

*Primary Examiner* — Yong J Choe
(74) *Attorney, Agent, or Firm* — Heather Johnston (57) ABSTRACT

A system may include a memory and a processor in communication with the memory configured to perform operations. The may operations include obtaining transaction logs in blocks from nodes of a data storage system. The operations may include, for each transaction log, splitting the transaction log into log entries, grouping log entries into groups associated with a same data source, and writing the log entries of the groups to empty blocks such that log entries from different groups do not share a same block. The operations may include identifying a same sequence of log entries from the written transaction logs and uploading first blocks of a first transaction log, including the same sequence of log entries, to an object-based storage without uploading second blocks of a second transaction log including the same sequence of log entries to the object-based storage.

20 Claims, 6 Drawing Sheets

MULTIPART UPLOADING TO OBJECT-BASED STORAGE

BACKGROUND

The present disclosure relates to object-based storage, and more specifically, to a method, system, and computer program product for multipart uploading to object-based storage.

Object-based storage emerged as a preferred method for data archiving and backup. Object-based storage is a data storage architecture for handling a large amount of unstructured data; it offers scalability beyond what traditional file-based or block-based storage offer. With object-based storage, data volumes may be stored and managed on the order of terabytes (TB s), petabytes (PBs), and even greater magnitudes.

A multipart upload may be used for uploading data objects to object-based storage. A multipart upload allows the upload of a single data object as a one piece of multiple parts. Each part may be a contiguous portion of the data object. These parts may be uploaded independent of each other. If transmission of any part fails, the failed part may be retransmitted without affecting other parts. After the parts of an object are uploaded, the parts may be assembled, and the object may be reconstructed on the object-based storage device.

For non-rational databases, there may be multiple data replicas distributed in primary node and secondary nodes. There may also be multiple transaction logs in such nodes; each transaction log may be backed-up from time to time to the object-based storage device as data objects for disaster recovery. A multipart upload method may be used to transfer transaction logs to object-based storage.

SUMMARY

Embodiments of the present disclosure include a system, method, and computer program product for multipart uploading to object-based storage.

In accordance with some embodiments of the present disclosure, a system may include a memory and a processor in communication with the memory. The processor may be configured to perform operations. The operations may include obtaining a plurality of transaction logs in blocks from a plurality of nodes of a data storage system; the plurality of transaction logs may include a first transaction log and a second transaction log. The operations may include, for each of the plurality of transaction logs, splitting the transaction log into log entries, grouping the log entries into groups such that the log entries in each of the groups are associated with a same data source, and writing the log entries of the groups to empty blocks; in some embodiments, log entries from different groups may not share a same block. The operations may include identifying a same sequence of log entries from the written first transaction log and the written second transaction log. The operations may include uploading one or more first blocks of the first transaction log that include the same sequence of log entries to an object-based storage. In some embodiments, uploading the one or more first blocks of the first transaction log may be completed without uploading one or more second blocks of the second transaction log that include the same sequence of log entries to the object-based storage.

In accordance with some embodiments of the present disclosure, a computer-implemented method may include obtaining a plurality of transaction logs in blocks from a plurality of nodes of a data storage system. The plurality of transaction logs may include a first transaction log and a second transaction log. The computer-implemented method may include, for each of the plurality of transaction logs, splitting the transaction log into log entries, grouping the log entries into groups such that the log entries in each of the groups are associated with a same data source, and writing the log entries of the groups to empty blocks; in some embodiments, log entries from different groups do not share a same block. The computer-implemented may method include identifying a same sequence of log entries from the written first transaction log and the written second transaction log. The computer-implemented method may include uploading one or more first blocks of the first transaction log that include the same sequence of log entries to an object-based storage. In some embodiments, uploading the one or more first blocks of the first transaction log may be completed without uploading one or more second blocks of the second transaction log that include the same sequence of log entries to the object-based storage.

In accordance with some embodiments of the present disclosure, a computer program product may include a computer readable storage medium having program instructions embodied therewith. The program instructions may be executable by a device to cause the device to perform a function. The function may include obtaining a plurality of transaction logs in blocks from a plurality of nodes of a data storage system; the plurality of transaction logs may include a first transaction log and a second transaction log. The function may include, for each of the plurality of transaction logs, splitting the transaction log into log entries, grouping the log entries into groups such that the log entries in each of the groups are associated with a same data source, and writing the log entries of the groups to empty blocks; in some embodiments, log entries from different groups do not share a same block. The function may include identifying a same sequence of log entries from the written first transaction log and the written second transaction log. The function may include uploading one or more first blocks of the first transaction log that include the same sequence of log entries to an object-based storage. In some embodiments, uploading the one or more first blocks of the first transaction log may be completed without uploading one or more second blocks of the second transaction log that include the same sequence of log entries to the object-based storage.

The above summary is not intended to describe each illustrated embodiment or every implementation of the disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Through the detailed description of some embodiments of the present disclosure in the accompanying drawings, the above, and other objects, features and advantages of the present disclosure will become apparent. The same reference may generally refer to the same component in various embodiments of the present disclosure.

The present disclosure is amenable to various modifications and alternative forms; specifics have been shown by way of example in the drawings and are described below. It is to be understood that disclosure is not limited to the particular embodiments described; the intent is to cover all modifications, equivalents, and alternatives falling within the spirit and scope of the present disclosure.

DETAILED DESCRIPTION

Aspects of the present disclosure relate to object-based storage, and more specifically, to a method, a system and a computer program product for multipart uploading to an object-based storage.

Some embodiments are described in detail with reference to accompanying drawings in which the embodiments of the present disclosure have been illustrated. The present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment currently known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned in accordance with demand. There may be some location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning may appear to be unlimited and may be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage may be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications may be accessible from various client devices through a thin client interface such as a web browser (e.g., web-based e-mail). The consumer may not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-generated or acquired applications created using programming languages and tools supported by the provider. The consumer may not manage or control the underlying cloud infrastructure including networks, servers, operating systems, or storage, but may have control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which may include operating systems and applications. The consumer may not manage or control the underlying cloud infrastructure but may have control over operating systems, storage, deployed applications, and possibly limited control of select networking components (e.g., host firewalls).

Deployment Models are as follows:

Private cloud: the cloud infrastructure may be operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and/or compliance considerations). It may be managed by the organization(s) or a third party and may exist on-premises or off-premises.

Public cloud: a cloud infrastructure available to the general public or a large industry group and owned by an organization selling cloud services.

Hybrid cloud: the cloud infrastructure is a composition of two or more clouds (private, community, or public) that remain unique entities but are bound together by standardized and/or proprietary technology that enables data and application portability (e.g., cloud bursting for load-balancing between clouds).

A cloud computing environment may be service oriented with a focus on statelessness, low coupling, modularity, and semantic interoperability. At the heart of cloud computing is an infrastructure that includes a network of interconnected nodes.

Figure 1:
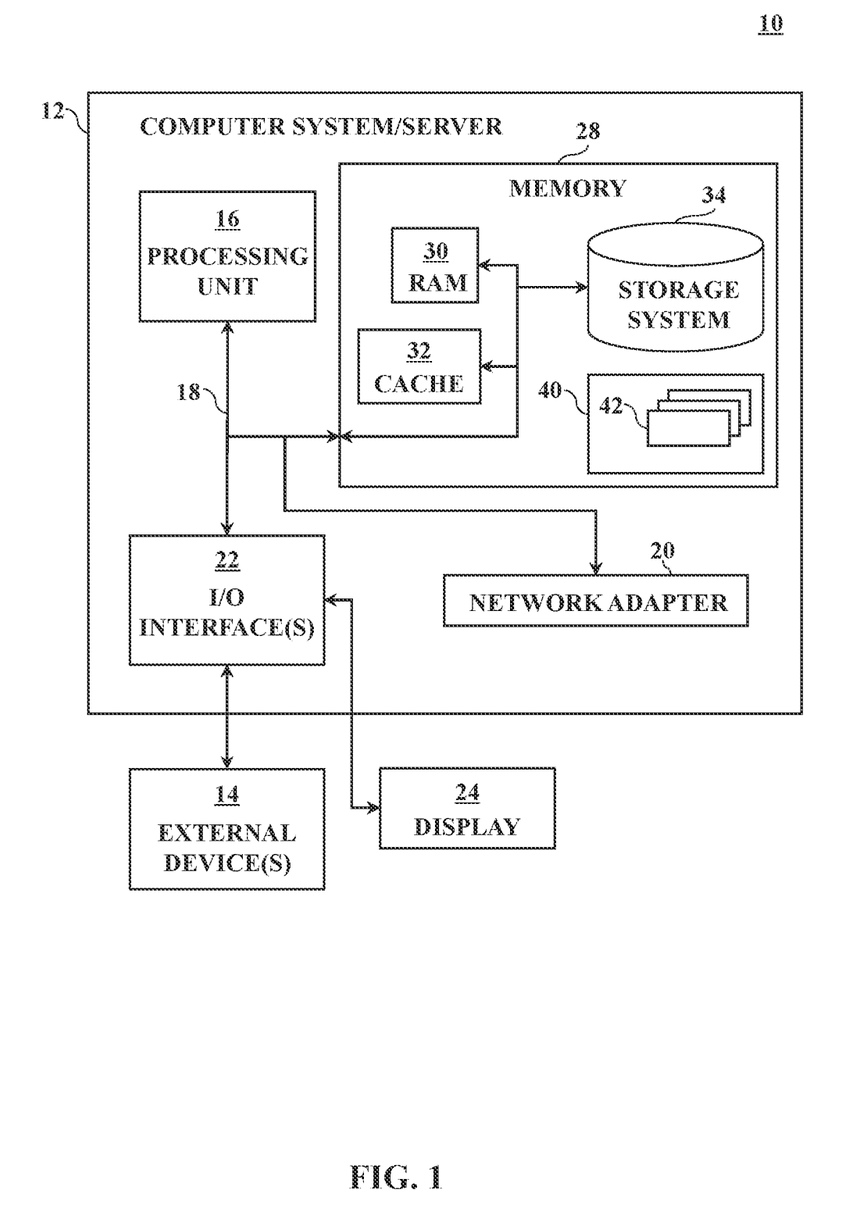
FIG. 1 illustrates a cloud computing node in accordance with some embodiments of the present disclosure.

Referring now to FIG. 1, a schematic of an example of a cloud computing node in accordance with some embodiments of the present disclosure is shown. A cloud computing node 10 is an example of a suitable cloud computing node and is not intended to suggest any limitation as to the scope of use or functionality of embodiments of the present disclosure described herein. Cloud computing node 10 may be capable of being implemented and/or performing any of the functionality set forth hereinabove.

In cloud computing node 10, there is a computer system/server 12 or a portable electronic device such as a communication device. The device may be operational with other general purpose or special purpose computing system environments and/or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, distributed cloud computing environments that include any of the above systems or devices, and the like.

The computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. The computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

The bus 18 may represent one or more of any of several types of bus structures, including a memory bus or memory controller, a peripheral bus, an accelerated graphics port, and a processor or local bus using any of a variety of bus architectures. By way of example, and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system/server 12 may typically include a variety of computer system readable media. Such media may be any available media that is accessible by the computer system/server 12, and it may include both volatile and non-volatile media, removable and non-removable media.

System memory 28 may include computer system readable media in the form of volatile memory such as random-access memory (RAM) 30 and/or cache memory 32. The computer system/server 12 may further include other removable/non-removable, volatile/non-volatile computer system storage media. By way of example, storage system 34 may be provided for reading from and writing to a non-removable, non-volatile magnetic media (not shown, typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk (such as a CD-ROM, DVD-ROM or other optical media) may be provided. In such instances, each may be connected to bus 18 by one or more data media interfaces. As will be further depicted and described below, memory 28 may include at least one program product having a set (e.g., at least one) of program modules configured to carry out functions of an embodiment of the present disclosure.

Program/utility 40, having a set (at least one) of program modules 42, may be stored in memory 28, by way of example, as well as an operating system, one or more application programs, other program modules, and/or program data. Each of the operating system, one or more application programs, other program modules, and program data or some combination thereof, may include an implementation of a networking environment. Program modules 42 may generally carry out functions and/or methodologies of embodiments as described herein.

The computer system/server 12 may also communicate with one or more external devices 14 such as a keyboard, a pointing device, a display 24, and the like; one or more devices that enable a user to interact with computer system/server 12; and/or any devices (e.g., network card, modem, etc.) that enable the computer system/server 12 to communicate with one or more other computing devices. Such communication may occur via Input/Output (I/O) interfaces 22. The computer system/server 12 may communicate with one or more networks such as a local area network (LAN), a general wide area network (WAN), and/or a public network (e.g., the Internet) via network adapter 20. As depicted, network adapter 20 may communicate with the other components of the computer system/server 12 via the bus 18. It should be understood that although not shown, other hardware and/or software components may be used in conjunction with the computer system/server 12. Examples include, but are not limited to, microcode, device drivers, redundant processing units, external disk drive arrays, RAID systems, tape drives, data archival storage systems, and the like.

Figure 2:
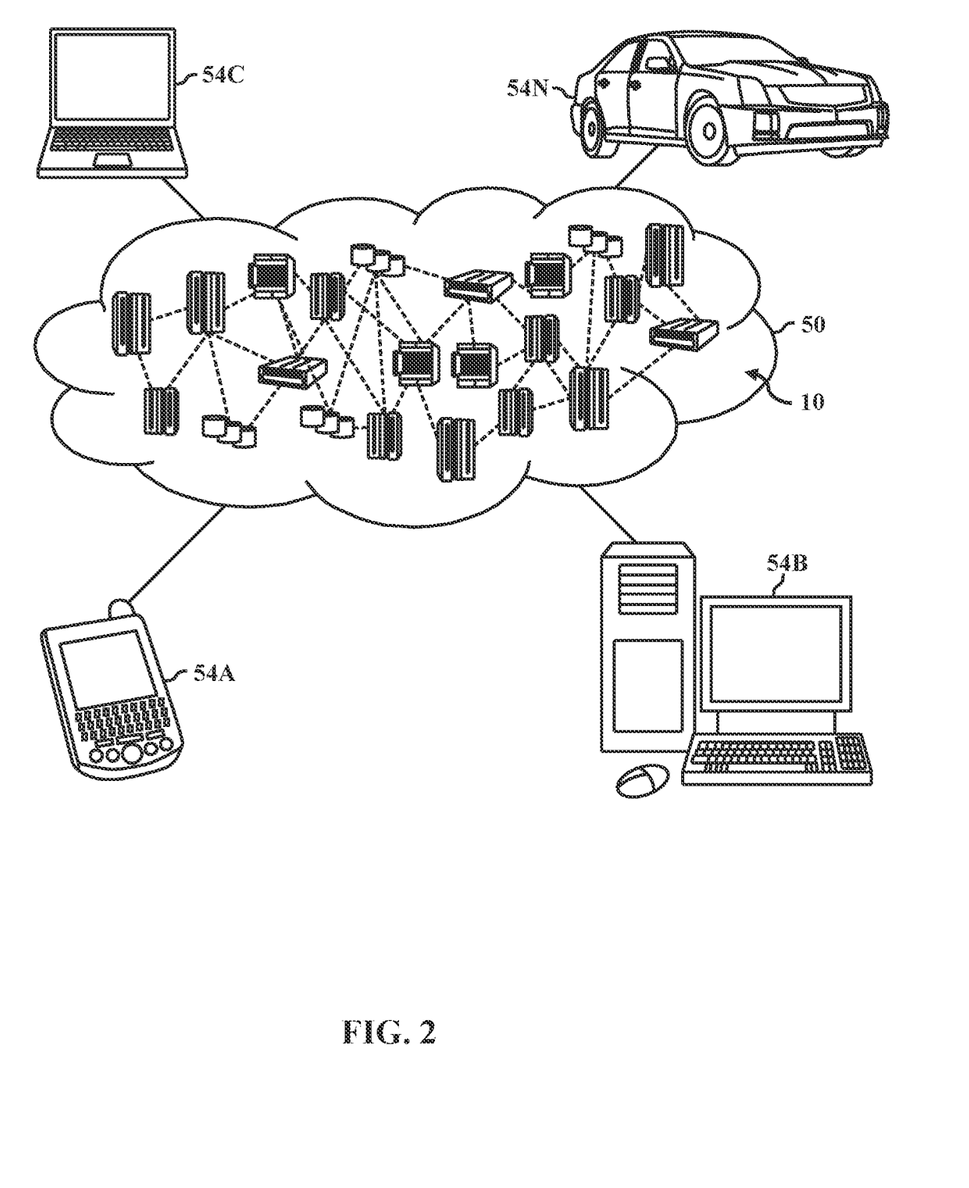
FIG. 2 depicts a cloud computing environment in accordance with some embodiments of the present disclosure.

Referring now to FIG. 2, an illustrative cloud computing environment 50 is depicted. As shown, the cloud computing environment 50 includes one or more cloud computing nodes 10 with which local computing devices used by cloud consumers may communicate; for example, the cloud computing nodes 10 may communicate with a personal digital assistant (PDA) or cellular telephone 54A, desktop computer 54B, laptop computer 54C, and/or automobile computer system 54N. Nodes 10 may communicate with one another. Nodes 10 may be grouped (not shown) physically or virtually in one or more networks, such as private, community, public, or hybrid clouds as described hereinabove, or a combination thereof. Grouping nodes 10 may allow a cloud computing environment 50 to offer infrastructure, platforms, and/or software as services for which a cloud consumer does not need to maintain resources on a local computing device.

It is understood that the types of computing devices 54A-N shown in FIG. 2 are intended to be illustrative only and that the computing nodes 10 and the cloud computing environment 50 may communicate with any type of computerized device over any type of network and/or network addressable connection (e.g., using a web browser).

Figure 3:
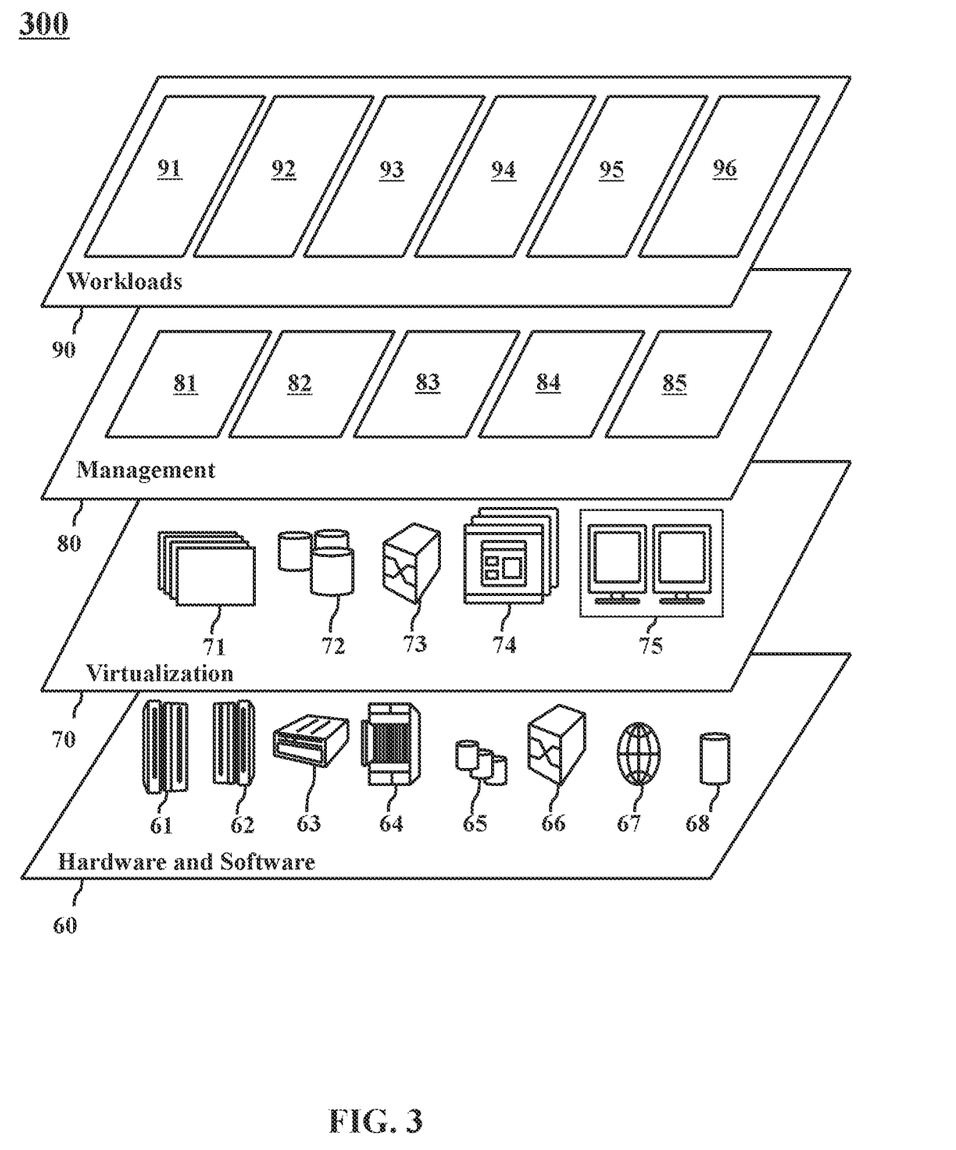
FIG. 3 illustrates abstraction model layers in accordance with some embodiments of the present disclosure.

Referring now to FIG. 3, a set of functional abstraction model layers 300 provided by cloud computing environment 50 (FIG. 2) is shown. It should be understood that the components, layers, and functions shown in FIG. 3 are intended to be illustrative only and embodiments of the present disclosure are not limited thereto. As depicted, the following layers and corresponding functions are provided:

Hardware and software layer 60 includes hardware and software components. Examples of hardware components include mainframes 61, Reduced Instruction Set Computer (RISC) architecture-based servers 62, servers 63, blade servers 64, storage devices 65, and networks and networking components 66. In some embodiments, software components may include network application server software 67 and/or database software 68.

Virtualization layer 70 provides an abstraction layer from which the following examples of virtual entities may be provided: virtual servers 71, virtual storage 72, virtual networks 73 (including virtual private networks), virtual applications and operating systems 74, and virtual clients 75.

In one example, management layer 80 may provide the functions described below. Resource provisioning 81 may provide dynamic procurement of computing resources and other resources utilized to perform tasks within the cloud computing environment. Metering and pricing 82 may provide cost tracking (as resources are utilized within the cloud computing environment) and billing or invoicing for consumption of these resources. For example, these resources may include application software licenses. Security provides identity verification for cloud consumers and tasks, as well as protection for data and other resources. User portal 83 may provide access to the cloud computing environment for consumers and system administrators. Service level management 84 provides cloud computing resource allocation and management such that required service levels are met. Service Level Agreement (SLA) planning and fulfillment 85 may provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91, software development and lifecycle management 92, virtual classroom education delivery 93, data analytics processing 94, transaction processing 95, and multipart uploading 96.

Although multipart upload may used to backup the transaction logs from nodes to the object-based storage as objects for disaster recovery; however, these objects may contain many duplicate entries. Log entries for different tenants and data sources may be mixed up in a transaction log. Thus, it may be difficult to perform de-duplication between transaction logs. Some embodiments of the present disclosure may address how to process the transaction logs so that de-duplication may be enabled. Additionally, some embodiments of the present disclosure may address how to efficiently update existing transaction logs when there is a new entry update.

Figure 4:
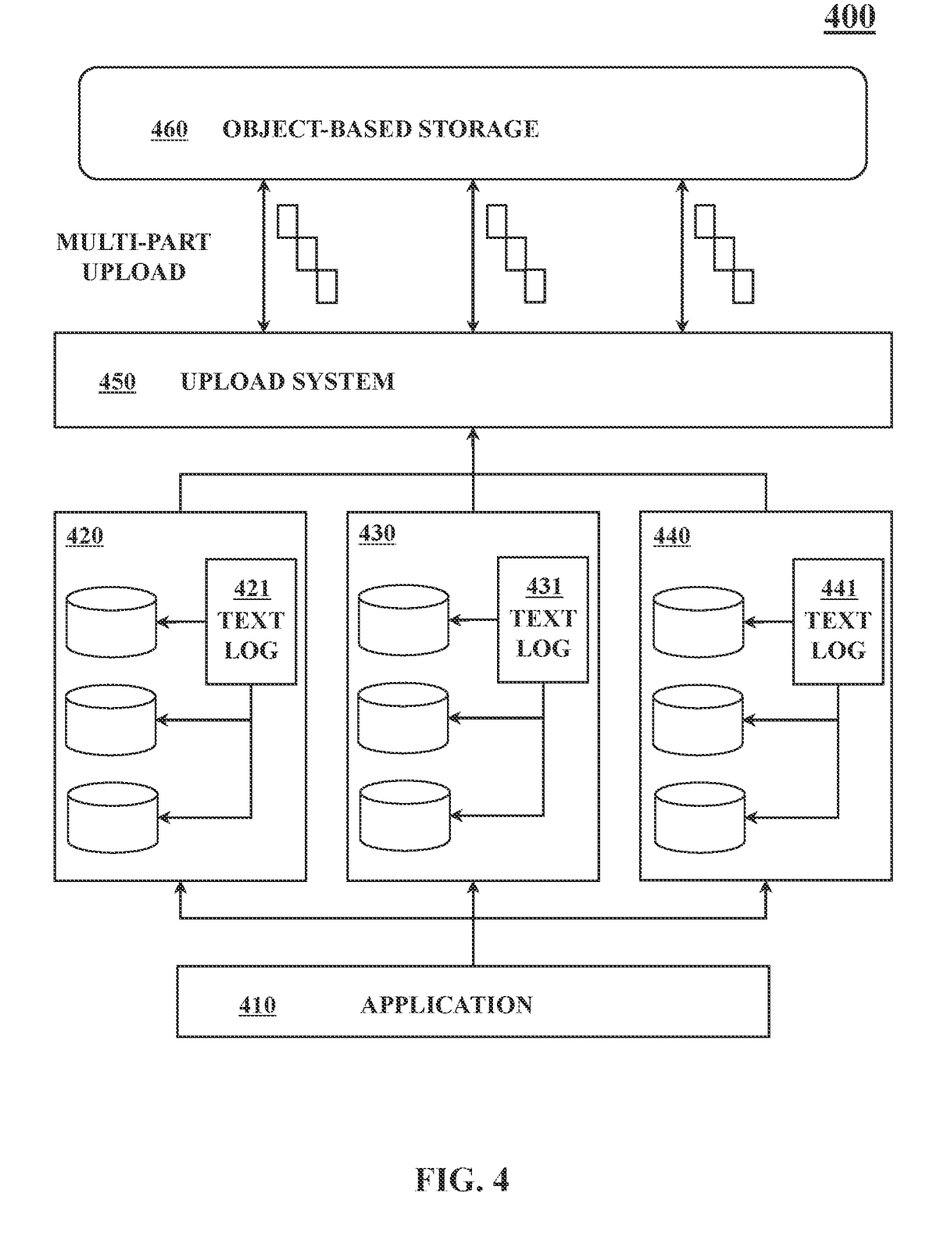
FIG. 4 depicts a diagram of a system function in accordance with some embodiments of the present disclosure.

FIG. 4 is a diagram 400 showing a system function in accordance with an embodiment of the present disclosure; the system is shown as upload system 450. There are three nodes 420, 430 and 440; one node 420 may be a primary node and the other nodes 430 and 440 may be secondary nodes. In this example, the system composed of the three nodes may provide a service to its client, e.g., application 410. In each of the nodes 420, 430 and 440, there is a transaction log. For example, the primary node 420 includes a transaction log 421, one of the secondary nodes 430 includes transaction log 431, and one of the secondary nodes 440 includes transaction log 441. The upload system 450 may obtain the transaction logs 421, 431 and 441 from the nodes, process the transaction logs 421, 431 and 441, and transfer the transaction logs 421, 431 and 441 to the object-based storage 460 by the multipart upload. The description below explains how to process the transaction logs prior to upload.

Figure 5:
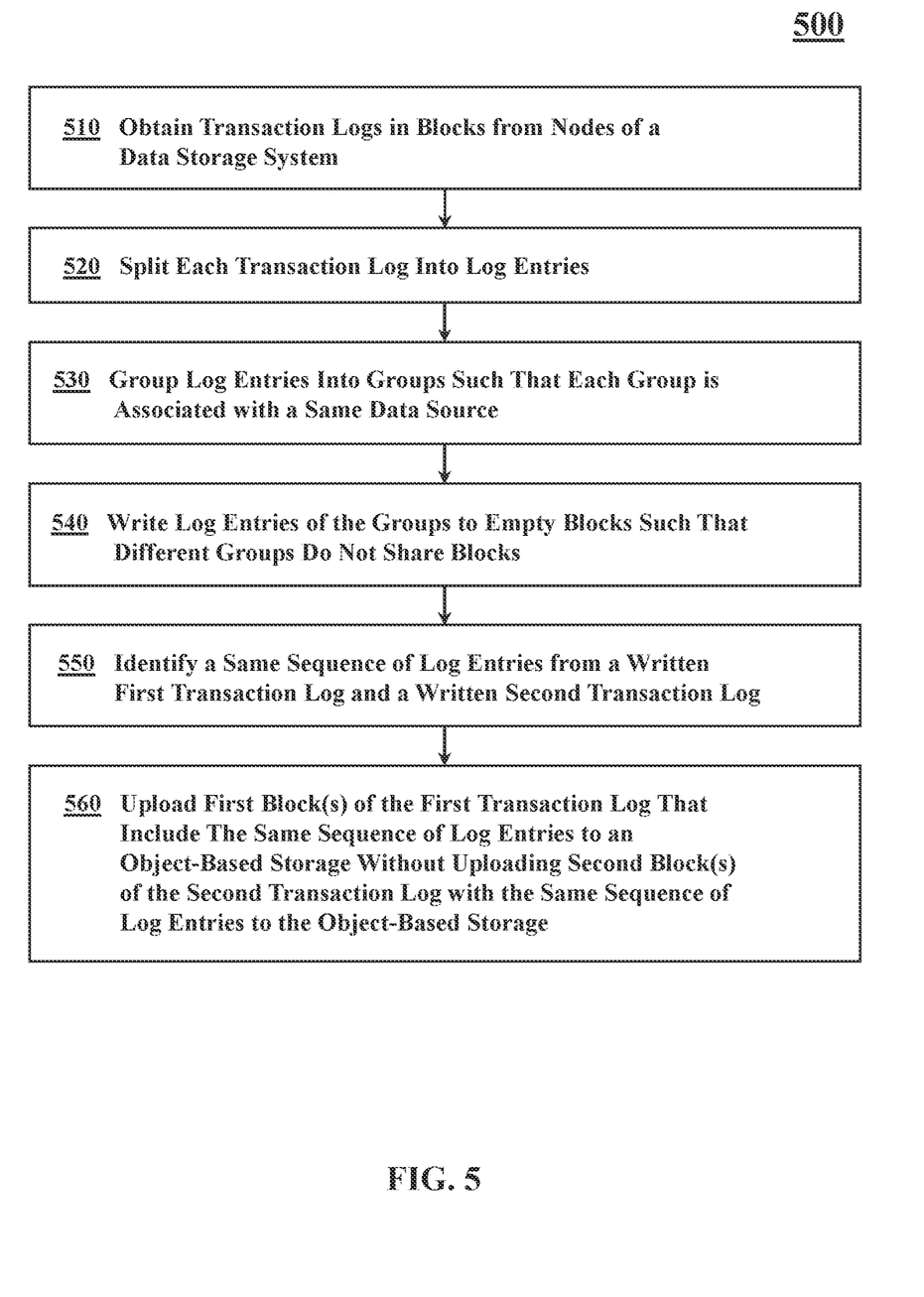
FIG. 5 illustrates a flowchart of a method for multipart uploading to an object-based storage in accordance with some embodiments of the present disclosure.

FIG. 5 is a flowchart 500 of a method for multipart uploading to an object-based storage in accordance with embodiments of the present disclosure. The method for multipart uploading to an object-based storage in accordance with embodiments of this disclosure may be implemented by the computer system/server 12 of FIG. 1 and/or the upload system 450 of FIG. 4.

As shown in FIG. 5, at step 510, a plurality of transaction logs may be obtained in blocks from a plurality of nodes of a data storage system. The transaction logs may include a first transaction log and a second transaction log. In some embodiments, a block may be a chunk. For example, in FIG. 4, the upload system 450 may obtain a first transaction log 421 from a first node 420, a second transaction log 431 from a second node 430, and a third transaction log 441 from a third node 440. The transaction logs may be big; thus, each of the transaction logs may be written in multiple chunks in its node. When a transaction log is retrieved from a node, it may be read in by chunks. The data storage system that includes the plurality of nodes may be a block-based storage system. FIG. 4 is an example for explaining the solution of the present disclosure; the number of nodes is not limited by the example in FIG. 4. For example, the number of nodes may be two or greater than three.

The transaction log is a history of actions executed by a database management system. The transaction log may be replayed in an idempotent way and finally reflected to the change on the database. The size of a transaction log may vary from MB to GB. The replication and backup for transaction logs may be used to recover from disaster.

For the sake of simplicity, examples of two transaction logs are shown as follows in Table 1 to explain the present disclosure. For example, the two transaction logs may be the ones obtained from node 1 and node 2, respectively.

TABLE 1

| Transaction log from Node 1 | Transaction log from Node 2 |
| --- | --- |
| { "ts" : Timestamp(1422998890, 4), "op" : "i", "ns" : "test.mycollection1", "o" : { "_id" : 1, "data" : "hello" } } | { "ts" : Timestamp(1422998890, 4), "op" : "i", "ns" : "test.mycollection1", "o" : { "_id" : 1, "data" : "hello" } } |
| { "ts" : Timestamp(1422999414, 1), "op" : "i", "ns" : "test.mycollection2", "o" : { "_id" : 2, "data" : "foo" } } | { "ts" : Timestamp(1422999419, 1), "op" : "i", "ns" : "test.mycollection1", "o" : { "_id" : 4, "data" : "bar" } } |
| { "ts" : Timestamp(1422999419, 1), "op" : "i", "ns" : "test.mycollection1", | { "ts" : Timestamp(1422999414, 1), "op" : "i", "ns" : "test.mycollection2", |

TABLE 1-continued

| Transaction log from Node 1 | Transaction log from Node 2 |
|---|---|
| "o" : {<br>    "_id" : 4,<br>    "data" : "bar"<br>  }<br>}<br>{<br>  "ts" : Timestamp(1423088919, 4),<br>  "op" : "i",<br>  "ns" : "test.mycollection1",<br>  "o" : {<br>    "_id" : 5,<br>    "data" : "baz"<br>  }<br>}<br>{<br>  "ts" : Timestamp(1423088967, 1),<br>  "op" : "i",<br>  "ns" : "test.mycollection2",<br>  "o" : {<br>    "_id" : 6,<br>    "data" : "world"<br>  }<br>}<br>{<br>  "ts" : Timestamp(1423088987, 1),<br>  "op" : "i",<br>  "ns" : "test.mycollection1",<br>  "o" : {<br>    "_id" : 8,<br>    "data" : "heaven"<br>  }<br>} | "o" : {<br>    "_id" : 2,<br>    "data" : "foo"<br>  }<br>}<br>{<br>  "ts" : Timestamp(1423088919, 4),<br>  "op" : "i",<br>  "ns" : "test.mycollection1",<br>  "o" : {<br>    "_id" : 5,<br>    "data" : "baz"<br>  }<br>}<br>{<br>  "ts" : Timestamp(1423088987, 1),<br>  "op" : "i",<br>  "ns" : "test.mycollection1",<br>  "o" : {<br>    "_id" : 8,<br>    "data" : "heaven"<br>  }<br>}<br>{<br>  "ts" : Timestamp(1423088967, 1),<br>  "op" : "i",<br>  "ns" : "test.mycollection2",<br>  "o" : {<br>    "_id" : 6,<br>    "data" : "world"<br>  }<br>} |

Table 1 shows a transaction log obtained from node 1 and a transaction log obtained from node 2. In Table 1, each of the transaction logs includes logs for six data operations. Although the six data operations for the two transaction logs should be same since the transaction log in a secondary node will record the same data operations as those in the primary node, their orders may not be the same in the two transaction logs, as shown in the above Table 1. A log for the first data operation in the transaction log from node 1 is shown as follows:

```
{
    "ts" : Timestamp(1422998890, 4),
    "op" : "i",
    "ns" : "test.mycollection1",
    "o" : {
        "_id" : 1,
        "data" : "hello"
    }
}
```

In the above log of data operation, the field of "ts" indicates a timestamp when recording this log, the field of "op" indicates type of the data operation, the field of "ns" indicates the data set to be operated, the field of "o" indicates content of the data operation, the field of "_id" indicates an identifier of data, and the field of "data" indicates the data per se. A transaction log is a data object that may include logs of data operations and/or logs of transactions. A log of a single transaction may include a log of one or more data operations. Logs of data operations in the transaction log may contain different operation types, such as insert ("i"), update ("u"), delete ("d") and the like. Thus, the above code segment means that "hello" with identifier 1 was inserted into "test.mycollection1" at time "Timestamp(1422998890, 4)." Specifically, each of the transaction logs in Table 1 involves logs of 6 insert operations.

FIG. 5 illustrates a flowchart of a method 500 for multi-part uploading to an object-based storage in accordance with some embodiments of the present disclosure.

The method 500 includes obtaining 510 transaction logs in blocks from the nodes of a storage system. The method 500 includes splitting 520 the transaction log into log entries for each of the plurality of transaction logs. In accordance with some embodiments of the present disclosure, each of the log entries may include a log of a data operation and/or a log of a single transaction; for example, in the example of Table 1, each of the transaction logs includes 6 log entries. A log entry may include information about type of data operation, its timestamp, the data object to be operated, the data per se, and the like. Table 1 shows an example in which a log entry includes a log of a data operation. In some embodiments, a log entry may include a log of a single transaction; for example, a singular transaction log entry may start with a statement such as "BEGIN TRANSACTION" and end with a statement such as "END TRANSACTION." The log of a single transaction may include logs of one or more data operations.

For the sake of simplicity, the present disclosure is discussed based on the example in which a log of a data operation is deemed as a log entry. In some embodiments, a log of a single transaction may be deemed as a log entry; for the example in Table 1, after the process of splitting 520 each transaction log into entries, the transaction logs from node 1 and node 2 may be split as shown in Table 2. In the example shown in Table 2, an "op" field may be identified in a transaction log at first, then a search for "{" may be performed forward from the position of "op", at last a search for "}" corresponding to the searched "1" may be performed backward from the position of "op". Thus, the content enclosed by the searched pair of "{" and "}" may be deemed as a log entry.

TABLE 2

| Transaction log from Node 1 | Transaction log from Node 2 |
|---|---|
| {<br>  "ts" : Timestamp(1422998890, 4),<br>  "op" : "i",<br>  "ns" : "test.mycollection1",<br>  "o" : {<br>    "_id" : 1,<br>    "data" : "hello"<br>  }<br>} | {<br>  "ts" : Timestamp(1422998890, 4),<br>  "op" : "i",<br>  "ns" : "test.mycollection1",<br>  "o" : {<br>    "_id" : 1,<br>    "data" : "hello"<br>  }<br>} |
| {<br>  "ts" : Timestamp(1422999414, 1),<br>  "op" : "i",<br>  "ns" : "test.mycollection2",<br>  "o" : {<br>    "_id" : 2,<br>    "data" : "foo"<br>  }<br>} | {<br>  "ts" : Timestamp(1422999419, 1),<br>  "op" : "i",<br>  "ns" : "test.mycollection1",<br>  "o" : {<br>    "_id" : 4,<br>    "data" : "bar"<br>  }<br>} |
| {<br>  "ts" : Timestamp(1422999419, 1),<br>  "op" : "i",<br>  "ns" : "test.mycollection1",<br>  "o" : {<br>    "_id" : 4, | {<br>  "ts" : Timestamp(1422999414, 1),<br>  "op" : "i",<br>  "ns" : "test.mycollection2",<br>  "o" : {<br>    "_id" : 2, |

TABLE 2-continued

| Transaction log from Node 1 | Transaction log from Node 2 |
|---|---|
|     "data" : "bar"<br>  }<br>} |     "data" : "foo"<br>  }<br>} |
| {<br>  "ts" :<br>Timestamp(1423088919, 4),<br>  "op" : "i",<br>  "ns" : "test.mycollection1",<br>  "o" : {<br>    "_id" : 5,<br>    "data" : "baz"<br>  }<br>} | {<br>  "ts" :<br>Timestamp(1423088919, 4),<br>  "op" : "i",<br>  "ns" : "test.mycollection1",<br>  "o" : {<br>    "_id" : 5,<br>    "data" : "baz"<br>  }<br>} |
| {<br>  "ts" :<br>Timestamp(1423088967, 1),<br>  "op" : "i",<br>  "ns" : "test.mycollection2",<br>  "o" : {<br>    "_id" : 6,<br>    "data" : "world"<br>  }<br>} | {<br>  "ts" :<br>Timestamp(1423088987, 1),<br>  "op" : "i",<br>  "ns" : "test.mycollection1",<br>  "o" : {<br>    "_id" : 8,<br>    "data" : "heaven'<br>  }<br>} |
| {<br>  "ts" :<br>Timestamp(1423088987, 1),<br>  "op" : "i",<br>  "ns" : "test.mycollection1",<br>  "o" : {<br>    "_id" : 8,<br>    "data" : "heaven"<br>  }<br>} | {<br>  "ts" :<br>Timestamp(1423088967, 1),<br>  "op" : "i",<br>  "ns" : "test.mycollection2",<br>  "o" : {<br>    "_id" : 6,<br>    "data" : "world"<br>  }<br>} |

In Table 2, the broken lines indicate the splitting positions; that is, the transaction log from node 1 is split into 6 log entries and the transaction log from node 2 is also split into 6 log entries. A log entry after the splitting may be moved as a unit in subsequent processes.

Referring to FIG. 5, the method 500 includes grouping 530 log entries into groups: for each of the transaction logs, the log entries may be grouped into groups. The log entries in each of the groups may be associated with a same data source such that each group is associated with the same data source. During grouping 530, log entries of a transaction log associated with the same data source may be retrieved; these log entries may be grouped to form one or more groups.

Log entries in one group may be processed together in subsequent processes. For the example in Table 2, the log entries of insert operations for the transaction logs from node 1 associated with two data sources, specifically, "test.mycollection1" and "test.mycollection2." Thus, log entries for the transaction logs from node 1 may be grouped into two groups. After grouping 530 log entries, the transaction logs from node 1 and node 2 may be grouped as shown in Table 3.

TABLE 3

| Transaction log from Node 1 | Transaction log from Node 2 |
|---|---|
| {<br>  "ts" : Timestamp(1422998890, 4),<br>  "op" : "i",<br>  "ns" : "test.mycollection1",<br>  "o" : {<br>    "_id" : 1, | {<br>  "ts" : Timestamp(1422998890, 4),<br>  "op" : "i",<br>  "ns" : "test.mycollection1",<br>  "o" : {<br>    "_id" : 1, |

TABLE 3-continued

| Transaction log from Node 1 | Transaction log from Node 2 |
|---|---|
|     "data" : "hello"<br>  }<br>} |     "data" : "hello"<br>  }<br>} |
| {<br>  "ts" : Timestamp(1422999419, 1),<br>  "op" : "i",<br>  "ns" : "test.mycollection1",<br>  "o" : {<br>    "_id" : 4,<br>    "data" : "bar"<br>  }<br>} | {<br>  "ts" : Timestamp(1422999419, 1),<br>  "op" : "i",<br>  "ns" : "test.mycollection1",<br>  "o" : {<br>    "_id" : 4,<br>    "data" : "bar"<br>  }<br>} |
| {<br>  "ts" : Timestamp(1423088919, 4),<br>  "op" : "i",<br>  "ns" : "test.mycollection1",<br>  "o" : {<br>    "_id" : 5,<br>    "data" : "baz"<br>  }<br>} | {<br>  "ts" : Timestamp(1423088919, 4),<br>  "op" : "i",<br>  "ns" : "test.mycollection1",<br>  "o" : {<br>    "_id" : 5,<br>    "data" : "baz"<br>  }<br>} |
| {<br>  "ts" : Timestamp(1423088987, 1),<br>  "op" : "i",<br>  "ns" : "test.mycollection1",<br>  "o" : {<br>    "_id" : 8,<br>    "data" : "heaven"<br>  }<br>}<br>>>>>>>>>>>>>>>>>>>>>>> | {<br>  "ts" : Timestamp(1423088987, 1),<br>  "op" : "i",<br>  "ns" : "test.mycollection1",<br>  "o" : {<br>    "_id" : 8,<br>    "data" : "heaven"<br>  }<br>}<br>>>>>>>>>>>>>>>>>>>>>>> |
| {<br>  "ts" : Timestamp(1422999414, 1),<br>  "op" : "i",<br>  "ns" : "test.mycollection2",<br>  "o" : {<br>    "_id" : 2,<br>    "data" : "foo"<br>  }<br>} | {<br>  "ts" : Timestamp(1422999414, 1),<br>  "op" : "i",<br>  "ns" : "test.mycollection2",<br>  "o" : {<br>    "_id" : 2,<br>    "data" : "foo"<br>  }<br>} |
| {<br>  "ts" : Timestamp(1423088967, 1),<br>  "op" : "i",<br>  "ns" : "test.mycollection2",<br>  "o" : {<br>    "_id" : 6,<br>    "data" : "world"<br>  }<br>} | {<br>  "ts" : Timestamp(1423088967, 1),<br>  "op" : "i",<br>  "ns" : "test.mycollection2",<br>  "o" : {<br>    "_id" : 6,<br>    "data" : "world"<br>  }<br>} |

In Table 3, for the transaction log from node 1, the four log entries (_id: 1, 4, 5, 8) associated with the data source "test.mycollection1" are grouped as group 1 and the two log entries (_id: 2, 6) associated with the data source "test.mycollection2" are grouped as group 2. The groups 1, 2 are separated by ">>>>>" in Table 3. For the transaction log from node 2, the first four log entries (_id: 1, 4, 5, 8) associated with the data collection "test.mycollection1" are grouped as group 3, and its last two log entries (_id: 2, 6) associated with the data source "test.mycollection2" are grouped as group 4. The groups 3, 4 are separated by ">>>>>" in Table 3.

In accordance with some embodiments of the present disclosure, after grouping 530 the log entries, the log entries in each group may optionally be sorted. The example in Table 3 shows that after the grouping 530, the left column of the log entries has a sequence identified by the "_id" field as 1, 4, 5, 8, 2 and 6 and the right column of log entries also has a sequence identified by the "_id" field as 1, 4, 5, 8, 2 and 6; thus, the log entries have the same order in the transaction logs from node 1 and node 2. In such an embodiment, it is not necessary to sort log entries in each group for the case of Table 3 because the log entries are already in the same order in the columns as in the transaction logs.

In some embodiments, the logs entries in corresponding groups from two transaction logs may not have the same order, and it may be preferred that the transaction logs be in the same order. For example, logs entries associated with the same data source may exist in corresponding groups from two transaction logs. In Table 3, group 1 and group 3 are corresponding groups, and group 2 and group 4 are corresponding groups; in this case, the in-group sorting may produce a definite order of log entries in the group between transaction logs.

In accordance with some embodiments, log entries in a group may be sorted by data owner or tenant such that log entries associated with the same data owner or tenant may be grouped together; for log entries associated with the same data owner or tenant, log entries may be further sorted in accordance with their timestamps. In accordance with some embodiments, log entries in a group may be sorted only by their timestamps; for example, to eliminate the influence of clock leap to the order of log entries, the log entries in a group may be sorted according to timestamps. The sorting may be performed in accordance with one or more dimensions; any sorting method may be used such that a definite order of log entries in a group may be generated between transactions logs.

The method 500 includes writing 540 the log entries of the groups to empty blocks; writing 540 the log entries may be done for each of the plurality of transaction logs. A block may be a chunk, and log entries from different groups may not share a same chunk. Log entries of a transaction log are written to new empty chunks to form a new transaction log. During the writing 540, log entries may be written one group after another, and log entries from different groups may be written to different chunks.

Figure 6:
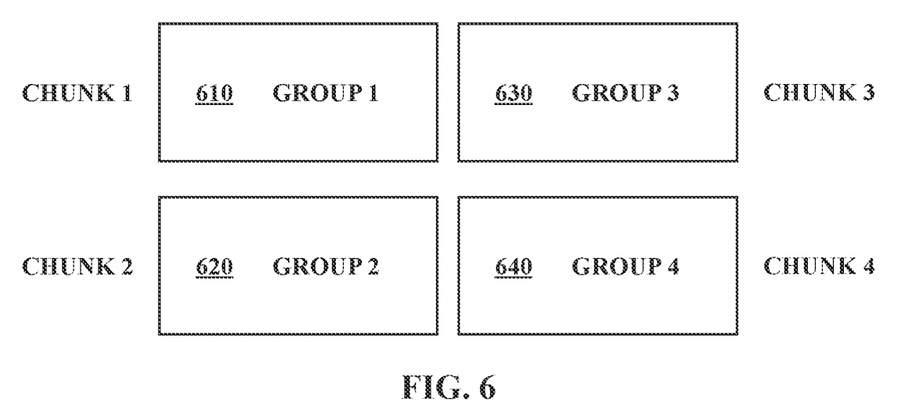
FIG. 6 depicts the chunks with written log entries in accordance with some embodiments of the present disclosure.

FIG. 6 shows the chunks with written log entries in accordance with the example in Table 3. Given the transaction log from node 1, group 1 610 will be written to chunk 1 and group 2 620 will be written to chunk 2; for the transaction log from node 2, group 3 630 will be written to chunk 3, and group 4 640 will be written to chunk 4.

Table 3 shows an example of a transaction log with few log entries; a transaction log may have hundreds or thousands of log entries. If a transaction log with hundreds or thousands of logs is written, it may occupy more than one chunk.

Figure 7:
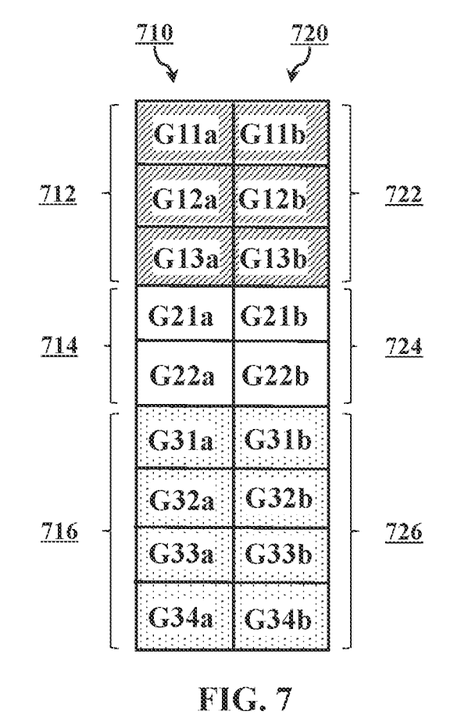
FIG. 7 illustrates a diagram showing an example of chunks of two written transaction logs in accordance with some embodiments of the present disclosure.

FIG. 7 is a diagram showing an example of chunks of two written transaction logs in accordance with some embodiment of the present disclosure. The left column 710 indicates chunks of the first transaction log and the right column 720 indicates chunks of the second transaction log. The first transaction log includes nine chunks from three groups: a first group 712, a second group 714, and a third group 716. The chunks G11*a*, G12*a*, and G13*a* are in the first group 712 and include log entries associated with a first data source; the chunks G21*a* and G22*a* are in the second group 714 and include log entries associated with a second data source; the chunks G31*a* G32*a*, G33*a* and G34*a* are in the third group 716 and include log entries associated with a third data source.

The second transaction log also includes nine chunks from three groups: a first group 722, a second group 724, and a third group 726. The chunks G11*b*, G12*b* and G13*b* are in the first group 722 and include log entries associated with the first data source; the chunks G21*b* and G22*b* are in the second group 724 and include log entries associated with the second data source; the chunks G31*b*, G32*b*, G33*b* and G34*b* are in the third group 726 and include log entries associated with the third data source. In some embodiments, the last chunk (e.g., G13*a*, G22*a*) of each group may be not full of log entries.

Referring back to FIG. 5, the method 500 includes identifying 550 a same sequence of log entries from the written first transaction log and the written second transaction log. Two sequences of log entries are the same if log entries in the two sequences are the same and have the same order; for example, for two same log entries, the fields of "op", "ns", "o", "_id", and "data" of the log entries will be the same. Note that the fields of "ts" of the log entries do not necessarily need to be the same; the fields of "ts" of the log entries may be different and the sequences of log entries may still be determined to be the same if the fields of "op", "ns", "o", "_id", and "data" of the log entries are the same. For example, in Table 3, both chunk 1 and chunk 3 have the same sequence of four log entries (_id: 1, 4, 5, 8) associated with the data source "test.mycollection1", and both chunk 2 and chunk 4 have the same sequence of two log entries (_id: 2, 6) associated with the data source "test.mycollection2".

The method 500 includes uploading 560 one or more first blocks of the first transaction log that include the same sequence of log entries; the first blocks of the transaction log may be uploaded to an object-based storage, and one or more second blocks of the second transaction log that include the same sequence of log entries may not be uploaded to the object-based storage. All blocks of the first transaction log are uploaded to an object-based storage but blocks of the second transaction log with the same sequence of log entries as the first transaction log are not uploaded to the object-based storage. Thus, de-duplication may be achieved in the backup of transaction logs from different nodes.

For the blocks of the first transaction log and the blocks of the second transaction log that do not share a same sequence of log entries, the blocks from both transaction logs will be uploaded to the object-based storage. For example, in Table 3, chunk 1 and chunk 2 of the transaction log from node 1 will be uploaded to an object-based storage, and chunk 3 and chunk 4 of the transaction log from node 2 will not be uploaded to the object-based storage; this is because chunk 3 has the same log entries as chunk 1 and chunk 4 has the same log entries as chunk 2.

In accordance with some embodiments of the present disclosure, the method 500 may further include analyzing the plurality of transaction logs to merge contiguous log entries of each of the plurality of transaction logs based on one or more criteria to form bigger log entries. In some embodiments, analyzing the transaction logs may occur while splitting 520 the transaction logs into log entries. The objective of analyzing the transaction logs may be to form a bigger (e.g., more robust) log entry than a basic log entry (e.g., a log of a data operation) to be moved in the subsequent processes. A bigger log entry may include more than one basic log entries (e.g., logs of more than one data operation). With bigger log entries, the number of log entries may be reduced and/or the intensity of subsequent computation may be reduced.

In accordance with some embodiment of the present disclosure, the one or more criteria may include one or more of: the contiguous log entries relate to the same data source, the contiguous log entries relate to the same data owner or tenant, and/or the contiguous log entries share a same data characteristic. Examples of data characteristic include size of database, time axis, and data format. Table 4 may be used to explain the merging step.

TABLE 4

| Transaction log from Node 1 | Transaction log from Node 2 |
|---|---|
| {<br>  "ts" : Timestamp(1422998890, 4),<br>  "op" : "i",<br>  "ns" : "test.mycollection1",<br>  "o" : {<br>    "_id" : 1,<br>    "data" : "hello"<br>  }<br>} | {<br>  "ts" : Timestamp(1422998890, 4),<br>  "op" : "i",<br>  "ns" : "test.mycollection1",<br>  "o" : {<br>    "_id" : 1,<br>    "data" : "hello"<br>  }<br>} |
| {<br>  "ts" : Timestamp(1422999419, 1),<br>  "op" : "i",<br>  "ns" : "test.mycollection1",<br>  "o" : {<br>    "_id" : 4,<br>    "data" : "bar"<br>  }<br>} | {<br>  "ts" : Timestamp(1422999419, 1),<br>  "op" : "i",<br>  "ns" : "test.mycollection1",<br>  "o" : {<br>    "_id" : 4,<br>    "data" : "bar"<br>  }<br>} |
| {<br>  "ts" : Timestamp(1422999414, 1),<br>  "op" : "i",<br>  "ns" : "test.mycollection2",<br>  "o" : {<br>    "_id" : 2,<br>    "data" : "foo"<br>  }<br>} | {<br>  "ts" : Timestamp(1422999414, 1),<br>  "op" : "i",<br>  "ns" : "test.mycollection2",<br>  "o" : {<br>    "_id" : 2,<br>    "data" : "foo"<br>  }<br>} |

In Table 4, as an example, each of the transaction logs includes three log entries. The first two log entries relate to the same data source "test.mycollection1" and thus may be merged into a single log entry; the resulting single log entry may be processed as a whole in the subsequent processes.

TABLE 5

| Transaction log from Node 1 | Transaction log from Node 2 |
|---|---|
| {<br>  "ts" : Timestamp(1422998890, 4),<br>  "op" : "i",<br>  "ns" : "test.mycollection1",<br>  "o" : {<br>    "_id" : 1,<br>    "data" : "hello"<br>  }<br>} | {<br>  "ts" : Timestamp(1422998890, 4),<br>  "op" : "i",<br>  "ns" : "test.mycollection1",<br>  "o" : {<br>    "_id" : 1,<br>    "data" : "hello"<br>  }<br>} |
| {<br>  "ts" : Timestamp(1422999419, 1),<br>  "op" : "i",<br>  "ns" : "test.mycollection1",<br>  "o" : {<br>    "_id" : 4,<br>    "data" : "bar"<br>  }<br>} | {<br>  "ts" : Timestamp(1422999419, 1),<br>  "op" : "i",<br>  "ns" : "test.mycollection1",<br>  "o" : {<br>    "_id" : 4,<br>    "data" : "bar"<br>  }<br>} |
| {<br>  "ts" : Timestamp(1422999414, 1),<br>  "op" : "i",<br>  "ns" : "test.mycollection2",<br>  "o" : {<br>    "_id" : 2,<br>    "data" : "foo"<br>  }<br>} | {<br>  "ts" : Timestamp(1422999414, 1),<br>  "op" : "i",<br>  "ns" : "test.mycollection2",<br>  "o" : {<br>    "_id" : 2,<br>    "data" : "foo"<br>  }<br>} |

As shown by the broken lines in Table 5, after merging, one log entry may include logs of more than one data operation. For example, in Table 5, a formed bigger log entry includes logs of two data operations with "_id" 1 and 4.

In accordance with some embodiments of the present disclosure, log entries associated with read-only operations may not be considered based on the one or more criteria. Read-only operations may not influence the replay from a transaction log to recover a database; thus, the read-only operations may be ignored in determining the splitting 520 position. For example, the following three arrangements of log entries in Table 6 may be deemed as the same in accordance with the present disclosure because the log entries of the read-only operations 1 and 2 are ignored.

TABLE 6

| Log entry of insert operation 1 | Log entry of insert operation 1 | Log entry of read-only operation 1 |
|---|---|---|
| Log entry of insert operation 2 | Log entry of read-only operation 1 | Log entry of insert operation 1 |
| Log entry of read-only operation 1 | Log entry of insert operation 2 | Log entry of insert operation 2 |
| | | Log entry of read-only operation 2 |

In accordance with an embodiment of the present disclosure, the method 500 shown in FIG. 5 may further include establishing a mapping between an ETags and a particular second chunk of the second transaction log. The ETag may be returned from the object-based storage in response to the uploading of a particular first chunk of the first transaction log to the object-based storage. The particular first chunk may include the same sequence of log entries with the particular second chunk of the second transaction log. The object-based storage may provide an interface that returns an ETag when a chunk is uploaded to the object-based storage.

In some embodiments, when the ETag is provided to the object-based storage via the interface, the chunk corresponding to the ETag may be returned; as a result, only one copy of duplicate chunks is uploaded to the object-based storage. For the duplicate chunk (e.g., the chunk that is not uploaded), an ETag pointing to the uploaded copy is stored. In accordance with some embodiments of the present disclosure, the method 500 may include, in response to a request to retrieve the particular second chunk of the second transaction log from the object-based storage, the particular first chunk of the first transaction log may be retrieved based on mapping.

For example, in Table 3, chunks 1 and 2 of the transaction log from node 1 may be uploaded to the object-based storage and chunks 3 and 4 of the transaction log from node 2 may not be uploaded to the object-based storage because they are duplicates of chunks 1 and 2. In such an embodiment, when chunk 1 is uploaded and ETag x is returned, a mapping between an ETag x and chunk 3 may be established, and when chunk 2 is uploaded and ETag y is returned, a mapping between an ETag y and chunk 4 may be established; when chunk 3 is retrieved by a user, chunk 1 may be returned from the object-based storage by using the ETag x, and when chunk 4 is retrieved by a user, chunk 2 may be returned from the object-based storage by using the ETag y.

In accordance with some embodiments of the present disclosure, the method 500 may include retrieving the particular first chunk from the object-based storage by using an ETag of the particular first chunk in response to a change occurring to one or more log entries in a particular first chunk. In some embodiments, the method 500 may include updating or appending changed one or more log entries in the particular first chunk and re-uploading the particular first chunk to the object-based storage and updating the ETag; such updating and/or re-uploading may be in response to a change occurring to one or more log entries in a particular first chunk.

Thus, de-duplication may be performed between two transaction logs. For more than two transaction logs, de-duplication may be performed between any two of the transaction logs. For example, de-duplication may be performed between the transaction log from a primary node and each of the transaction logs from secondary nodes. Additionally, in the multipart upload, a part corresponds to a chunk of a transaction log in accordance with the present disclosure.

In accordance with the present disclosure, parts (e.g., chunks) of a transaction log (e.g., an object) may be uploaded in parallel, de-duplication between transaction logs with messed log entries may be achieved, and, when there is a log entry update, existing transaction logs in the object-based storage may be efficiently updated.

The present disclosure may be a system, a method, and/or a computer program product at any technical detail level of integration. The computer program product may include a computer readable storage medium (or media) having computer readable program instructions thereon for causing a processor to carry out aspects of the present disclosure.

The computer readable storage medium may be a tangible device that may retain and store instructions for use by an instruction execution device. The computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products in accordance with embodiments of the present disclosure. It is to be understood that each block of the flowchart illustrations and/or block diagrams, and combinations of blocks in the flowchart illustrations and/or block diagrams, may be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products in accordance with various embodiments of the present disclosure. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It is also to be understood that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, and/or to enable others of ordinary skill in the art to understand the embodiments disclosed herein.

What is claimed is:

1. A system, said system comprising:
a memory;
a processor in communication with said memory, said processor configured to perform operations, said operations comprising:
obtaining a plurality of transaction logs in blocks from a plurality of nodes of a data storage system, wherein said plurality of transaction logs include a first transaction log and a second transaction log;
for each of said plurality of transaction logs:
splitting said transaction log into log entries;
grouping said log entries into groups, said log entries in each of said groups being associated with a same data source; and
writing said log entries of said groups to empty blocks, wherein log entries from different groups do not share a same block;
identifying a same sequence of log entries from a written first transaction log and a written second transaction log; and
uploading one or more first blocks of said first transaction log that include said same sequence of log entries to an object-based storage, without uploading one or more second blocks of said second transaction log that include said same sequence of log entries to said object-based storage.

2. The system of claim 1, wherein each of said log entries comprises a log of a data operation, and said splitting further comprises:
analyzing said plurality of transaction logs to merge contiguous log entries of each of said plurality of transaction logs based on one or more criteria to form bigger log entries.

3. The system of claim 2, wherein said one or more criteria include at least one of:
said contiguous log entries relate to said same data source;
said contiguous log entries relate to said same data owner or tenant; or
said contiguous log entries share a same data characteristic.

4. The system of claim 3, wherein log entries associated with read-only operations are not considered based on said one or more criteria.

5. The system of claim 1, said grouping further comprises:
sorting said log entries in each group.

6. The system of claim 1, said operations further comprising:
establishing a mapping between an Entity Tag (ETag) and a particular second block of said second transaction log, wherein said ETag is returned from said object-based storage in response to uploading of a particular first block of said first transaction log to said object-based storage and said particular first block includes said same sequence of log entries with said particular second block of said second transaction log; and
in response to a request to retrieve said particular second block of said second transaction log from said object-based storage, retrieving said particular first block of said first transaction log based on said mapping.

7. The system of claim 6, said operations further comprising:
in response to a change occurring to at least one log entry in said particular first block, retrieving said particular first block from said object-based storage by using said ETag;
updating said at least one log entry in said particular first block;
re-uploading said particular first block to said object-based storage; and
updating said ETag.

8. A computer-implemented method, said computer-implemented method comprising:
obtaining, by one or more processing units, a plurality of transaction logs in blocks from a plurality of nodes of a data storage system, wherein said plurality of transaction logs include a first transaction log and a second transaction log;
for each of said plurality of transaction logs:
splitting, by said one or more processing units, said transaction log into log entries;
grouping, by said one or more processing units, said log entries into groups, said log entries in each of said groups being associated with a same data source; and writing, by said one or more processing units, said log entries of said groups to empty blocks, wherein log entries from different groups do not share a same block;

identifying, by said one or more processing units, a same sequence of log entries from a written first transaction log and a written second transaction log; and uploading, by said one or more processing units, one or more first blocks of said first transaction log that include said same sequence of log entries to an object-based storage, without uploading one or more second blocks of said second transaction log that include said same sequence of log entries to said object-based storage.

9. The computer-implemented method of claim 8, wherein each of said log entries comprises a log of a data operation.

10. The computer-implemented method of claim 8, said splitting further comprising:

analyzing, by said one or more processing units, said plurality of transaction logs to merge contiguous log entries of each of said plurality of transaction logs based on one or more criteria to form bigger log entries.

11. The computer-implemented method of claim 10, wherein said one or more criteria include at least one of:

said contiguous log entries relate to said same data source;
said contiguous log entries relate to said same data owner or tenant; or
said contiguous log entries share a same data characteristic.

12. The computer-implemented method of claim 8, further comprising:

establishing a mapping between an Entity Tag (ETag) and a particular second block of said second transaction log, wherein said ETag is returned from said object-based storage in response to uploading of a particular first block of said first transaction log to said object-based storage and said particular first block includes said same sequence of log entries with said particular second block of said second transaction log; and in response to a request to retrieve said particular second block of said second transaction log from said object-based storage, retrieving said particular first block of said first transaction log based on said mapping.

13. The computer-implemented method of claim 8, said grouping further comprising:

sorting, by said one or more processing units, said log entries in each group.

14. The computer-implemented method of claim 8, further comprising:

establishing, by said one or more processing units, a mapping between an Entity Tag (ETag) and a particular second block of said second transaction log, wherein said ETag is returned from said object-based storage in response to uploading of a particular first block of said first transaction log to said object-based storage and said particular first block includes said same sequence of log entries with said particular second block of said second transaction log; and in response to a request to retrieve said particular second block of said second transaction log from said object-based storage, retrieving, by said one or more processing units, said particular first block of said first transaction log based on said mapping.

15. The computer-implemented method of claim 14, further comprising:

in response to a change occurring to one or more log entries in said particular first block, retrieving, by said one or more processing units, said particular first block from said object-based storage by using said ETag;

updating or appending, by said one or more processing units, said one or more log entries in said particular first block; and re-uploading, by said one or more processing units, said particular first block to said object-based storage and updating said ETag.

16. A computer program product comprising a computer readable storage medium having program instructions embodied therewith, wherein said program instructions being executable by a device to cause said device to perform a function comprising:

obtaining a plurality of transaction logs in blocks from a plurality of nodes of a data storage system, wherein said plurality of transaction logs include a first transaction log and a second transaction log;

for each of said plurality of transaction logs:
splitting said transaction log into log entries;
grouping said log entries into groups, said log entries in each of said groups being associated with a same data source; and
writing said log entries of said groups to empty blocks, wherein log entries from different groups do not share a same block;

identifying a same sequence of log entries from a written first transaction log and a written second transaction log; and uploading one or more first blocks of said first transaction log that include said same sequence of log entries to an object-based storage, without uploading one or more second blocks of said second transaction log that include said same sequence of log entries to said object-based storage.

17. The computer program product of claim 16, wherein each of said log entries comprises a log of a data operation, and said splitting further comprises:

analyzing said plurality of transaction logs to merge contiguous log entries of each of said plurality of transaction logs based on one or more criteria to form bigger log entries.

18. The computer program product of claim 17, wherein said one or more criteria include at least one of:

said contiguous log entries relate to said same data source;
said contiguous log entries relate to said same data owner or tenant; or
said contiguous log entries share a same data characteristic.

19. The computer program product of claim 16, wherein said grouping further comprises:

sorting said log entries in each group.

20. The computer program product of claim 16, wherein said function further comprises:

establishing a mapping between an Entity Tag (ETag) and a particular second block of said second transaction log, wherein said ETag is returned from said object-based storage in response to uploading of a particular first block of said first transaction log to said object-based storage and said particular first block includes said same sequence of log entries with said particular second block of said second transaction log; and in response to a request to retrieve said particular second block of said second transaction log from said object-based storage, retrieving said particular first block of said first transaction log based on said mapping.

* * * * *